Jan. 13, 1953  G. AGINS  2,625,327
ELECTROMECHANICAL CALCULATING APPARATUS
Filed Dec. 4, 1945  3 Sheets-Sheet 1

INVENTOR:
George Agins
BY
*Hoguet, Neary & Campbell*
ATTORNEYS

INVENTOR
George Agins

Jan. 13, 1953  G. AGINS  2,625,327
ELECTROMECHANICAL CALCULATING APPARATUS
Filed Dec. 4, 1945  3 Sheets-Sheet 3

INVENTOR
George Agins
BY
Hoguet, Neary & Campbell
ATTORNEYS

Patented Jan. 13, 1953

2,625,327

UNITED STATES PATENT OFFICE 2,625,327

ELECTROMECHANICAL CALCULATING APPARATUS

George Agins, Brooklyn, N. Y., assignor to Arma Corporation, Brooklyn, N. Y., a corporation of New York Application December 4, 1945, Serial No. 632,651

10 Claims. (Cl. 235—61)

This invention relates to electromechanical calculating apparatus, and has particular reference to an improved device for multiplying and ratio work generally.

One form of electromechanical calculating apparatus of the general type to which the present invention pertains is disclosed in copending application Serial No. 346,183, filed July 18, 1940, by applicant, refiled December 6, 1946, as a continuation, and issued March 29, 1949, as Patent No. 2,465,624. By means of that apparatus, various trigonometric functions of a variable angle can be continuously produced and simultaneously multiplied by a linear value. In that apparatus the linear value, in the form of a modulation of a carrier frequency, is fed into a stator winding and, the angle value is applied to a rotor winding in the field of the stator winding, whereby the answer appears across the output rotor winding as an electrical value. Such a device has proven eminently satisfactory for making trigonometric calculations involving vectors. However, it is desirable in certain computations to be able to multiply a value furnished as a modulation of a carrier frequency by the angle value directly, rather than by a trigonometric function of the angle. It is also sometimes desirable to use such a device for multiplying two continuously varying values by each other, one of them being applied to the device as an amplitude modulation of a carrier frequency and the other applied as an angle, and it is to this latter use that this invention is especially directed.

In accordance with the invention, when a trigonometric multiplier, such as described in said copending application, is reconstructed to provide certain coils connected in series in a certain position and of a certain number of winding turns relatively to the winding turns of the other coils of the multiplier, the output voltage over a considerable angle of the rotary shaft input is substantially directly proportional to the angle, and therefore the device becomes a proportionality machine or multiplier. For instance, if the stator or modulation member is provided with one coil and the rotor or angle member has two coils arranged in quadrature, one in series with the stator coil, this effect obtains. Alternatively, if the stator member has two coils in quadrature and the rotor has one coil with the series connection, the effects are similar, provided, of course, that in each case the turn ratios of all the coils are fixed in a certain way, as hereinafter specified.

It will be seen that the electromechanical calculating apparatus of this invention smoothly and accurately functions as a proportionality unit, or a multiplier, directly producing an electrical value without the step-by-step action that characterizes conventional multipliers, so that it can be used safely and advantageously as a unit in a regenerative type calculating mechanism and does not cause the mechanism to oscillate by reason of a step variation anywhere in its circuit.

A more complete understanding of the invention may be had by reference to the accompanying drawings, in which.

Figure 1:
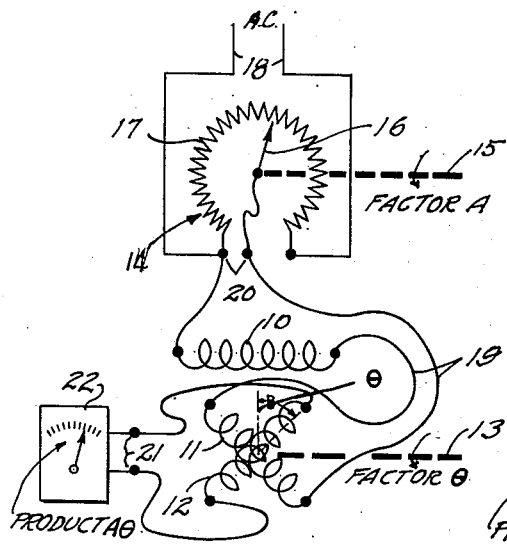
Figure 1 is an electrical diagram of one form of the electromechanical calculating apparatus of this invention.

Referring to Fig. 1, the winding 10 represents a stator coil in an electromechanical calculating apparatus or resolver embodying this invention, and the windings 11 and 12 represent similar coils arranged in space quadrature and serving as the corresponding rotor which is adapted to be rotated in the field of stator 10 by angle input shaft 13. In the form of the invention shown in Fig. 1, the stator winding 10 is the input winding to which is applied an alternating current modulated as to amplitude with a numerical value, which is one factor of the multiplication to be performed. Such modulation may be prepared by the potentiometer or voltage divider 14, wherein the rotary shaft 15 drives a brush 16 over a uniform resistance coil 17, so as to modulate the alternating current applied to coil 17 by the source 18, as is well understood. Also as shown in Fig. 1, the stator winding 10 is connected to output terminals 20 of potentiometer 14 and rotor winding 11 is connected in series with stator winding 10 by flexible leads 19. The other rotor winding 12 is connected by flexible leads to the terminals of a suitable indicator such as the meter 22, to be described.

In operation of the electromechanical calculating apparatus of this invention as shown in Fig. 1, the alternating current from source 18 is modulated in potentiometer 14 by the adjustment of its brush 16 by shaft 15 in accordance with the input factor A. This modulated carrier-frequency current across output terminals 20 of potentiometer 14 is fed to coil 10 and the magnetic field created thereby affects, by electromagnetic induction, the two rotor coils 11 and 12 in that field so as to produce therein currents proportional to the modulation value and a sine or cosine of the angle, $\theta$, through which they are rotated by shaft 13 relatively to the stator coil 10. However, inasmuch as the rotor coil 11 is connected in series with the stator coil 10, the modulated current in coil 10 flows also in the rotor coil 11. Thus, the magnetic field threading the coil 10 is not that which would be produced solely by the stator coil 10, but is also a function of the angle $\theta$, the input angle which rotor coil 11 makes with the stator coil 10. The rotor coil 12, which is the product or output coil, therefore rotates through the input angle $\theta$ in a field which in turn is being modified by a function of the same angle, as is hereinafter set forth mathematically. As a result of this arrangement, it will be seen that, for a very considerable portion of its total possible rotation, rotor coil 12 will give as its output the product of the modulation value applied to coils 10 and 11 and the rotor angle $\theta$. This highly accurate product, AB, may be represented by the deflection of the pointer or scale index of the meter 22, for example.

According to "Esbach's Handbook of Engineering Fundamentals," published in 1936 by John Wiley & Son, section 8, page 29, formula (24), if two coils like 10 and 11 in Fig. 1 have mutual inductance M, resistances $r_1$ and $r_2$, inductances $L_1$ and $L_2$, currents $i_1$ and $i_2$ and rates of change of currents $$\frac{di_1}{dt} \text{ and } \frac{di_2}{dt}$$

and consequent voltage drops $v_1$ and $v_2$, then $$v_1 = r_1 i_1 + L_1 \frac{di_1}{dt} + M \frac{di_2}{dt} \quad (1)$$

$$v_2 = r_2 i_2 + L_2 \frac{di_2}{dt} + M \frac{di_1}{dt} \quad (2)$$

In the device of this invention, if the voltages $v_1$ and $v_2$ are called $e_1$ and $e_2$, the $ir$ drop is neglected, the inductances $L_1$ and $L_2$ are represented by the number of turns $N_1$ and $N_2$ of coils 10 and 11, respectively, and the mutual inductance, which is variable due to the angle input 13, is represented by $N_1 \cos \theta$ and $N_2 \cos \theta$, it follows that in both inductances 10 and 11, since they are connected in series, the current value is $i$. In other words $$e_1 = N_1 \frac{d\phi_1}{dt} + N_1 \frac{d\phi_2}{dt} \cos \theta \quad (3)$$

$$e_2 = N_2 \frac{d\phi_2}{dt} + N_2 \frac{d\phi_1}{dt} \cos \theta \quad (4)$$

wherein, field strength, $$\varphi_1 = a N_1 i \text{ and } \varphi_2 = a N_2 i \quad (5)$$

where $a$ = reluctance of the system. Substituting (5) in (3) and (4)

$$e_1 = a N_1^2 \frac{di}{dt} + a N_1 N_2 \frac{di}{dt} \cos \theta \quad (6)$$

$$e_2 = a N_2^2 \frac{di}{dt} + a N_1 N_2 \frac{di}{dt} \cos \theta \quad (7)$$

But, since coils 10 and 11 are in series the total voltage $$e = e_1 + e_2 = a \frac{di}{dt} (N_1^2 + 2 N_1 N_2 \cos \theta + N_2^2) \quad (8)$$

Now, if $e^1$ = output voltage (product), and $N_3$ = turns in coil 12, then $$e^1 = N_3 \frac{d\phi_1}{dt} \sin \theta = a \frac{di}{dt} N_1 N_3 \sin \theta \quad (9)$$

substituting for a $$\frac{di}{dt}$$

the value $$\frac{e}{(N_1^2 + 2 N_1 N_2 \cos \theta + N_2^2)} \text{ from } (8)$$

$$e^1 = \frac{e N_1 N_3 \sin \theta}{N_1^2 + 2 N_1 N_2 \cos \theta + N_2^2} \quad (10)$$

$$\frac{e^1}{e} = \frac{N_1 N_3}{N_1^2 + N_2^2} \cdot \frac{\sin \theta}{1 + k \cos \theta} \quad (11)$$

where $$k = \frac{2 N_1 N_2}{N_1^2 + N_2^2}$$

Figure 3:
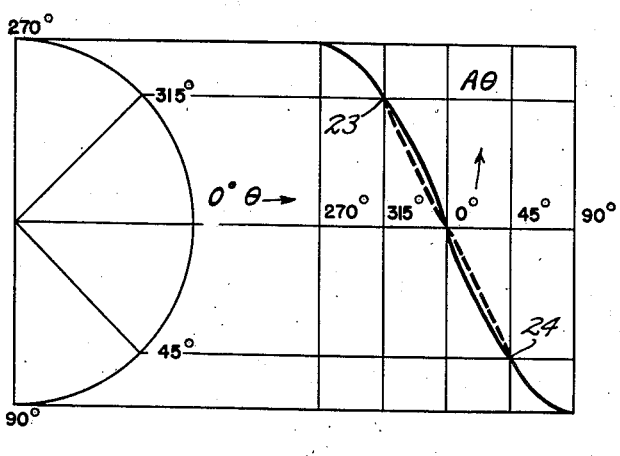
Fig. 3 is a wave diagram of the electrical output of the apparatus of this invention.

If $k = .52$, then $$\frac{e^1}{e}$$

is seen to be linear to within .03% between $\pm 45°$, or the points 23 and 24 on the curve of Fig. 3, in which the horizontal or abscissa axis represents the input angle for the function $\theta$, and the ordinates are corresponding products representing $A\theta$, assuming factor A to remain constant. As is evident, the semi-circle at the left of Fig. 3 represents the circular path of the rotor coil 11. The transformation ratio $$\frac{N_2}{N_1}$$

which results in a vlaue of $k = .52$ can be found from the relationship between $k$, $N_1$, and $N_2$ given above. Thus:

$$.52 = \frac{2 N_1 N_2}{N_1^2 + N_2^2}$$

Algebraic manipulation results in the following equation for $$\frac{N_2}{N_1}$$

$$52 \left(\frac{N_2}{N_1}\right)^2 - 2 \left(\frac{N_2}{N_1}\right) + .52 = 0$$

from which $$\frac{N_2}{N_1}$$

is found to be either .28 or 3.57.

The calculating apparatus of this invention accordingly differs advantageously for the stated purposes from that of the trigonometric resolver disclosed in the said copending application whose characteristic output curve is shown by the solid line curve in Fig. 3, which has a characteristic sine form with the slight symmetrical bulges between points 23 and 24 at 315° and 45°. Compared to this curve, the output curve of the apparatus of the present invention is straight between the 45° and 135° positions of the rotor, as indicated by the dotted line between points 23 and 24 in Fig. 3. The apparatus of this invention accordingly functions as a proportionality unit or multiplier, but unlike the step-by-step action of a multiplier of the voltage divider type like that indicated at 14, the action of the apparatus of the invention is perfectly smooth, the steps in changing output being infinitesimal. This is advantageous for use in calculating mechanisms where the action is regenerative, because such a system is easily thrown into oscillation by step variation anywhere in the circuit. In order to avoid phase shift through the multiplier and consequent error, the output rotor coil 12 must be so placed relatively to the other rotor coil 11 that there is practically no mutual inductance at any time.

Figure 2:
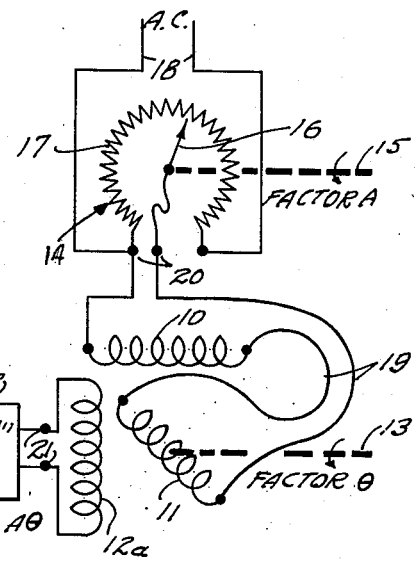
Fig. 2 is an electrical diagram of a modification of the invention.

Referring to the modification of the invention shown by Fig. 2, the same coils are used as indicated by the same reference characters and the stator coil 10 is in series with the rotor coil 11 as seen in Fig. 1. However, the coil 12 has been removed from the rotor and placed on the stator at right angles to the stator coil 10, as shown at 12a, so that stator coils 10 and 12a shall have substantially no mutual inductance. With this arrangement the same formulas and curves obtain with appropriate modification, and the product of the input factors A and $\theta$ is shown by measurement of the output voltage of coil 12a, as on the meter 22. Thus, instead of obtaining the product voltage from one rotor coil as in Fig. 1, it may be obtained from a single stator coil 12a in Fig. 2, and the formula corresponding here to aforementioned formula (11) will be $$\frac{e''}{e} = \frac{N_2 N_4}{N_1^2 + N_2^2} \cdot \frac{\sin \theta}{1 + k \cos \theta}$$

where:

$e''$ = instantaneous voltage of coil 12a,
$N_4$ = number of turns of coil 12a.

This arrangement also has the advantage of eliminating one pair of slip-rings, which is especially valuable in computer work.

Figure 4:
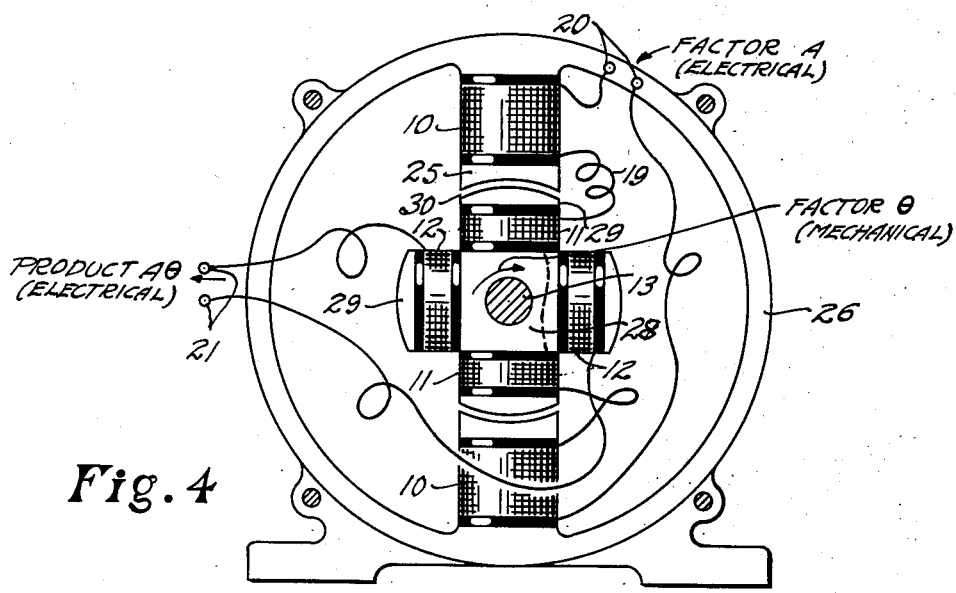
Fig. 4 illustrates a physical embodiment of the theoretical arrangement of Fig. 1.
Figure 6:
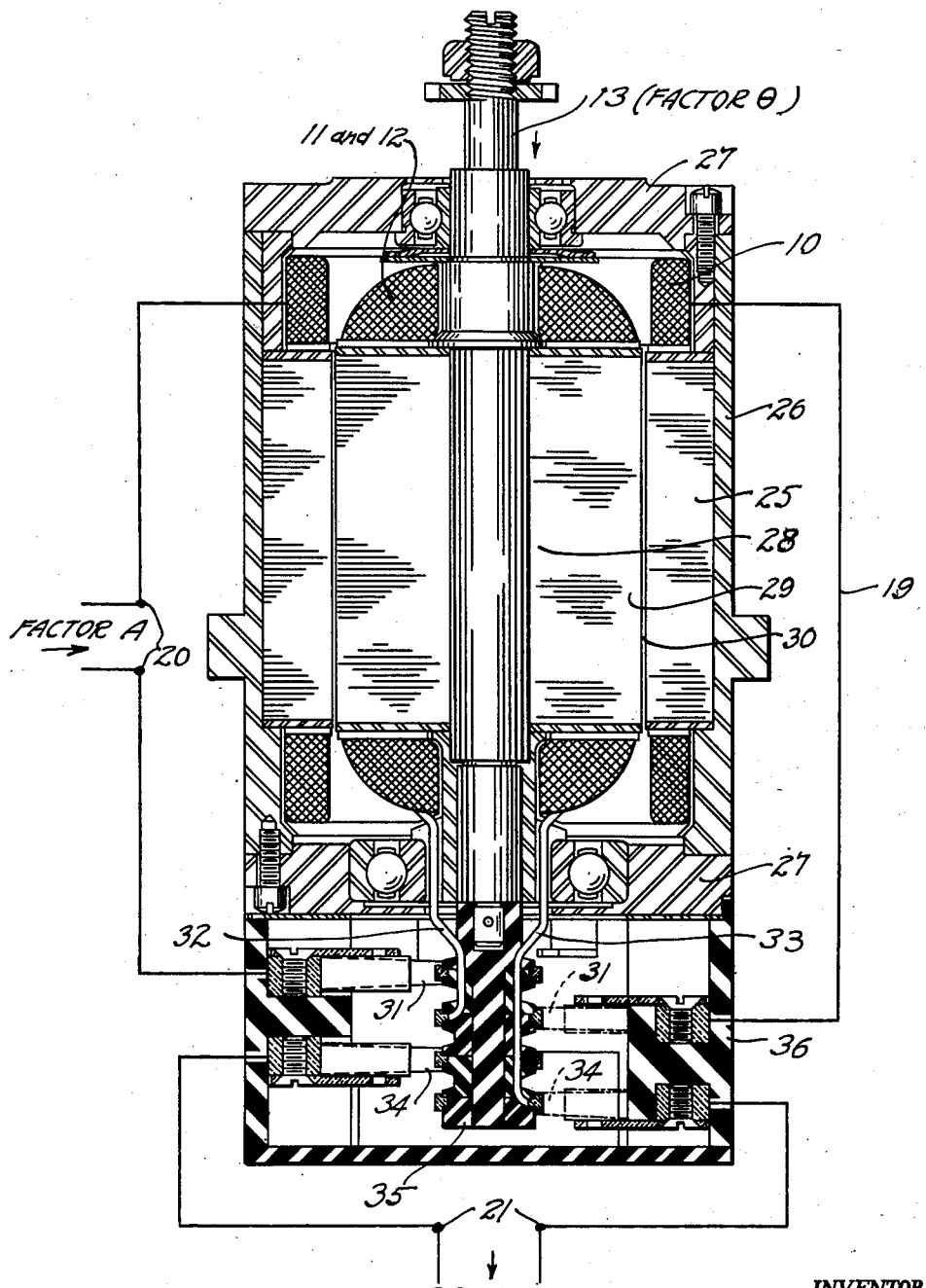
Fig. 6 is an axial section through an apparatus embodying this invention adapted for quantity manufacture.

Referring to Fig. 4, which is a transverse section through an electromechanical physical embodiment of the calculating apparatus shown diagrammatically in Fig. 1, and also to Fig. 6, which is an axial section through the same arrangement, adapted for quantity production, the same reference characters being used to designate the parts corresponding to those of Fig. 1. The stator poles 25 comprise a stack of laminations of iron, soft steel, or equivalent magnetic material mounted on or constituting part of a suitable conducting frame 26 having end plates 27 in which the rotor shaft 13 is suitably journalled, as shown in Fig. 6. Shaft 13 carries a laminated core 28 which is slotted to form poles 29 cooperating across an air gap 30 with the stator poles 25 and carrying the rotor windings 11 and 12 as shown.

Input of the electrical factor A is supplied from terminals 20 to stator coils 10 and by wires 19 to rotor coils 11, as by the slip-rings, brushes 31 and connection 32 shown in Fig. 6. Although only one brush and slip-ring combination is necessary, two sets are shown, the dotted line brush being omitted if desired, by using the arrangement of Fig. 2. Input of the mechanical angle factor $\theta$ on rotor shaft 13 causes the electrical product $A\theta$ to be induced in coil 12 and is taken off by connection 33 and slip-ring and brush combinations 34 and impressed on terminals 21 of a meter or other indicator 22, as shown in Fig. 1. The slip-rings may be carried on an insulating extension 35 on shaft 13 and housed with brushes 31 and 34 in an insulating housing 36 mounted on casing 26 and also serving as a brush holder as shown in Fig. 6, which illustrates an assembly suitable for quantity production.

Figure 5:
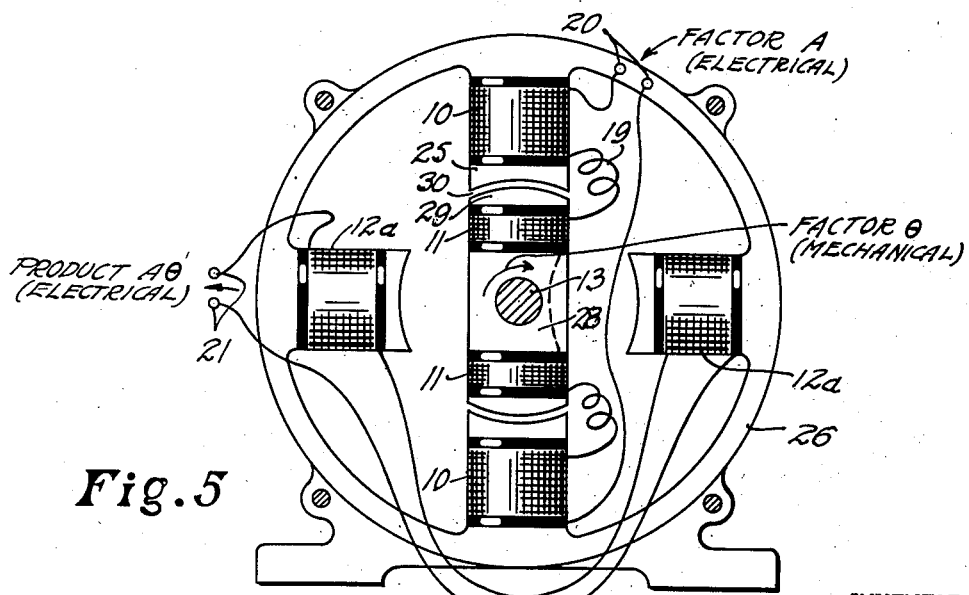
Fig. 5 shows a similar physical embodiment of the arrangement of Fig. 2.

Just as the mechanical arrangement of Fig. 4 follows the schematic arrangement of Fig. 1, the mechanical arrangement of Fig. 5 follows the schematic arrangement of Fig. 2. Thus, the same parts in Figs. 2 and 5 are identified by the same reference characters, coils 12a forming with coils 10 of the stator coils of the assembly and the rotor coils 11 mounted on mechanical factor $\theta$ input shaft 13 as before. Fig. 6 will serve to illustrate a perferred embodiment of the arrangement of Fig. 5 as well as that of Fig. 4, except that the stator includes two coils, 10 and 12a and the rotor one coil, 11, instead of two. The operation of Fig. 5 is the same as that described in connection with Fig. 2.

Although certain preferrred embodiments of the invention have been illustrated and described herein, it is to be understood that the invention is not limited thereby, but is susceptible of changes in form and detail within the scope of the appended claims.

I claim:

1. In an electromechanical calculating apparatus for computing the product of two values, the combination of an input stator winding, a source of input alternating current connected thereto for creating a magnetic field therewith, said source being adjustable in accordance with the magnitude of one of said values, an input rotor winding inductively positioned in the magnetic field of said input stator winding, mechanical input means for adjusting the angle of said rotor winding relatively to said stator winding in accordance with the other of said values, series connections between said rotor winding and said stator winding, an output winding positioned in inductive relation to one of said input stator and rotor windings and responsive only to a function of the magnetic fields created thereby, and indicating means directly connected to said output winding for indicating the product of said values, the turn ratio between said input rotor winding and said input stator winding being substantially .28 or 3.57.

2. In an electromechanical calculating apparatus for computing the product of two values, the combination of an input stator winding, a source of input alternating current connected thereto for creating a magnetic field therewith, said source being adjustable in accordance with the magnitude of one of said values, an input rotor winding inductively positioned in the magnetic field of said input stator winding, mechanical input means for adjusting the angle of said rotor winding relatively to said stator winding in accordance with the other of said values, series connections between said rotor windings and said stator winding, an output stator winding arranged in space quadrature to said input stator winding and positioned in inductive relation to said input rotor winding, said output stator winding being responsive only to a function of the magnetic fields created by said input stator and rotor windings, and indicating means directly connected to said output winding for indicating the product of said two values, the turn ratio between said input rotor winding and said input stator winding being substantially .28 or 3.57.

3. In an electromechanical calculating apparatus for computing the product of two values, the combination of an input stator winding, a source of input alternating current connected thereto for creating a magnetic field therewith, said source being adjustable in accordance with the magnitude of one of said values, an input rotor winding inductively positioned in the magnetic field of said input stator winding, mechanical input means for adjusting the angle of said rotor winding relatively to said stator winding in accordance with the other of said values, series connections between said rotor winding and said stator winding, an output rotor winding connected to said mechanical input means and arranged in space quadrature to said input rotor winding, said output rotor winding being responsive only to a function of the magnetic fields created by said input stator and rotor windings, and indicating means directly connected to said output winding for indicating the product of said two values, the turn ratio between said input rotor winding and said input stator winding being substantially .28 or 3.57.

4. In an electromechanical calculating apparatus for computing the product of two values, the combination of an input stator winding, a source of input alternating current connected thereto for creating a magnetic field therewith, means interposed between said source and said input stator winding for modulating the alternating current fed to the former in accordance with the magnitude of one of said values, an input rotor winding inductively positioned in the magnetic field of said input stator winding, mechanical input means for adjusting the angle of said rotor winding relatively to said stator winding in accordance with the other of said values, series connections between said rotor winding and said stator winding, an output stator winding arranged in space quadrature to said input stator winding and positioned in inductive relation to said input rotor winding, said output stator winding being responsive only to a function of the magnetic fields created by said input stator and rotor windings, and indicating means connected to said output winding for indicating the product of said two values, the turn ratio between said input rotor winding and said input stator winding being substantially .28 or 3.57.

5. In an electromechanical calculating apparatus for computing the product of two values, the combination of an input stator winding, a source of input alternating current connected thereto for creating a magentic field therewith, means interposed between said source and said input stator winding for modulating the alternating current fed to the former in accordance with the magnitude of one of said values, an input rotor winding inductively positioned in the magnetic field of said input stator winding, mechanical input means for adjusting the angle of said rotor winding relatively to said stator winding in accordance with the other of said values, series connections between said rotor winding and said stator winding, an output rotor winding connected to said mechanical input means and arranged in space quadrature to said input rotor winding, said output rotor winding being responsive only to a function of the magnetic fields created by said input stator and input rotor windings, and indicating means connected to said output winding for indicating the product of said two values, the turn ratio between said input rotor winding and said input stator winding being substantially .28 or 3.57.

6. In an electromechanical calculating apparatus for computing the products of two values, the combination of an input stator winding having $N_1$ turns, a source of input alternating current connected thereto for creating a magnetic field therewith, a potentiometer interposed between said source and said input stator winding and having a coil and a brush adjustable thereover, mechanical input means for adjusting said brush in accordance with the magnitude of one of said values to thereby modulate the alternating current fed to said input stator winding, an input rotor winding of $N_2$ turns inductively positioned in the magnetic field of said input stator winding, mechanical input means for adjusting the angle of said rotor winding relatively to said stator winding in accordance with the other of said values, series connections between said rotor winding and said stator winding, an output stator winding positioned in space quadrature to said input stator winding and responsive only to a function of the magnetic fields created by said input stator and input rotor windings, and indicating means connected to said output winding for indicating the product of said two values, said input stator winding and said input rotor winding being so designed that the value for the quantity $$\frac{N_2}{N_1}$$

is substantially .28 or 3.57 while the value for the quantity $$\frac{2N_1N_2}{N_1^2+N_2^2}$$

is substantially .52.

7. In an electromechanical calculating apparatus for computing the product of two values, the combination of an input stator winding having $N_1$ turns, a source of input alternating current connected thereto for creating a magnetic field therewith, a potentiometer interposed between said source and said input stator winding and having a coil and a brush adjustable thereover, mechanical input means for adjusting said brush in accordance with the magnitude of one of said values to thereby modulate the alternating current fed to said input stator winding, an input rotor winding of $N_2$ turns inductively positioned in the magnetic field of said input stator winding, mechanical input means for adjusting the angle of said rotor winding relatively to said stator winding in accordance with the other of said values, series connections between said rotor winding and said stator winding, an output rotor winding connected to said mechanical input means and arranged in space quadrature to said input rotor winding, said output rotor winding being responsive only to a function of the magnetic fields created by said input stator and input rotor windings, and indicating means connected to said output winding for indicating the product of said two values, said input stator winding and said input rotor winding being so designed that the value for the quantity $$\frac{N_2}{N_1}$$

is substantially .28 or 3.57 while the value for the quantity $$\frac{2N_1N_2}{N_1^2+N_2^2}$$

is substantially .52.

8. In an electromechanical calculating apparatus for multiplying a variable value represented by modulation of a first carrier wave continuously by a second variable represented by an angle and expressing the product as a modulation of a similar carrier wave, the combination of a source of said first carrier wave, means for modulating said carrier wave in accordance with said variable value, an induction member connected to said source for creating a magnetic field in response to said first modulated carrier wave, a second induction member positioned in said magnetic field, means for adjusting said second induction member through said angle, series connections between said first and second induction members, a third induction member positioned in inductive relation to one of said first and second induction members and responsive only to a function of the magnetic fields created by said first and second induction members, and an indicator energized by the voltage induced in said third member for indicating said multiplication, the turn ratio between said second and first induction members being substantially .28 or 3.57.

9. In an electromechanical calculating apparatus for multiplying a variable value represented by modulation of a first carrier wave continuously by said second variable represented by an angle and expressing the product as a modulation of a similar carrier wave, the combination of a source of said first carrier wave, means for modulating said carrier wave in accordance with the magnitude of said variable value, an induction member connected to said source for creating a magnetic field in response to said first modulated carrier wave, a second induction member positioned in said magnetic field, means for adjusting said second induction member through said angle, series connections between said first and second induction members, a third induction member in the field of said first induction member and responsive only to the magnetic fields created by said first and second induction members, and an indicator energized by the voltage induced in said third member for indicating said multiplication, the turn ratio between said second and first induction members being substantially .28 or 3.57.

10. In an electromechanical calculating apparatus for multiplying a variable value represented by modulation of a first carrier wave continuously by said second variable represented by an angle and expressing the product as a modulation of a similar carrier wave, the combination of a source of said first carrier wave, means for modulating said carrier wave in accordance with the magnitude of said variable value, an induction member connected to said source for creating a magnetic field in response to said first modulated carrier wave, a second induction member positioned in said magnetic field, means for adjusting said second induction member through said angle, series connections between said first and second induction members, a third induction member in the field of said second induction member and responsive only to a function of the magnetic fields created by said first and second induction members, and an indicator energized by the voltage induced in said third member for indicating said multiplication, the turn ratio between said second and first induction members being .28 or 3.57.

GEORGE AGINS.

REFERENCES CITED

The following references are of record in the file of this patent:

UNITED STATES PATENTS

| Number | Name | Date |
|---|---|---|
| 698,684 | Duncan | Apr. 29, 1902 |
| 1,667,497 | Shapiro | Apr. 24, 1928 |
| 2,053,077 | Harrison | Sept. 1, 1936 |
| 2,080,186 | Reymond | May 11, 1937 |
| 2,382,994 | Holden | Aug. 21, 1945 |
| 2,402,359 | Bedford | June 18, 1946 |
| 2,417,229 | Alexanderson | Mar. 11, 1947 |